United States Patent
Yatabe et al.

(10) Patent No.: US 8,929,439 B2
(45) Date of Patent: Jan. 6, 2015

(54) COMPRESSED IMAGE NOISE REMOVAL DEVICE AND REPRODUCTION DEVICE

(75) Inventors: Yusuke Yatabe, Yokohama (JP); Hironori Komi, Tokyo (JP)

(73) Assignee: Hitachi Maxwell, Ltd., Osaka (JP)

( * ) Notice: Subject to any disclaimer, the term of this patent is extended or adjusted under 35 U.S.C. 154(b) by 744 days.

(21) Appl. No.: 12/993,920

(22) PCT Filed: Jun. 8, 2009

(86) PCT No.: PCT/JP2009/060422
§ 371 (c)(1),
(2), (4) Date: Nov. 22, 2010

(87) PCT Pub. No.: WO2010/013543
PCT Pub. Date: Feb. 4, 2010

(65) Prior Publication Data
US 2011/0064135 A1   Mar. 17, 2011

(30) Foreign Application Priority Data

Jul. 30, 2008   (JP) ................................. 2008-195634

(51) Int. Cl.
*H04N 7/30*       (2006.01)
*H04N 19/86*      (2014.01)
(Continued)

(52) U.S. Cl.
CPC ..... *H04N 19/00909* (2013.01); *H04N 19/0089* (2013.01); *H04N 19/00066* (2013.01); *H04N 19/00157* (2013.01); *H04N 19/00296* (2013.01); *H04N 19/00533* (2013.01); *H04N 19/00278* (2013.01); *H04N 19/00775* (2013.01); *H04N 19/00781* (2013.01); *H04N 19/00563* (2013.01)
USPC .................................................. 375/240.03

(58) Field of Classification Search
CPC ................. H04N 19/00066; H04N 19/00157; H04N 19/00278; H04N 19/00296; H04N 19/00533; H04N 19/00563; H04N 19/00775; H04N 19/00781; H04N 19/0089; H04N 19/00909

USPC ........................................ 375/240.29, 240.03
See application file for complete search history.

(56) References Cited

U.S. PATENT DOCUMENTS 5,920,356 A * 7/1999 Gupta et al. .................. 348/606
5,946,421 A * 8/1999 Kim .............................. 382/261
(Continued)

FOREIGN PATENT DOCUMENTS

EP    0 714 209    5/1996
JP    06-070173    3/1994
(Continued)

*Primary Examiner* — Mehrdad Dastouri
*Assistant Examiner* — Mohammed Rahaman
(74) *Attorney, Agent, or Firm* — Antonelli, Terry, Stout & Kraus, LLP.

(57) ABSTRACT

A compressed-image noise removal device includes a decoder unit for decoding a digital-image-compressed stream, an information holding unit for holding sub information by the amount of a plurality of blocks, the sub information being decoded by a VLD unit, a noise judgment unit for making a judgment on noise removal of a display image generated by the decoder unit, and the information holding unit, a noise removal unit for executing the noise removal of a block whose noise removal has been judged to be executed by the noise judgment unit, using image data outputted from an inverse quantization unit, motion compensation data outputted from a motion compensation unit, and the sub information held in the information holding unit, and a display-image holding unit for holding, as a display image, an output image of the noise removal unit if the noise removal has been judged to be executed by the noise judgment unit, or the output of the decoder unit if the noise removal has been judged not to be executed thereby.

5 Claims, 11 Drawing Sheets

(51) Int. Cl.
*H04N 19/80* (2014.01)
*H04N 19/117* (2014.01)
*H04N 19/14* (2014.01)
*H04N 19/18* (2014.01)
*H04N 19/44* (2014.01)
*H04N 19/176* (2014.01)
*H04N 19/60* (2014.01)
*H04N 19/61* (2014.01)
*H04N 19/48* (2014.01)

(56) References Cited

U.S. PATENT DOCUMENTS

| | | |
|---|---|---|
| 6,256,349 B1 | 7/2001 | Suzuki et al. |
| 6,539,060 B1* | 3/2003 | Lee et al. .................. 375/240.29 |
| 7,486,830 B2 | 2/2009 | Kimura |
| 2005/0243914 A1* | 11/2005 | Kwon et al. ............. 375/240.03 |
| 2006/0093232 A1* | 5/2006 | Yang et al. ..................... 382/254 |
| 2006/0210182 A1* | 9/2006 | Kimura .......................... 382/233 |
| 2007/0160129 A1* | 7/2007 | Fujisawa et al. .............. 375/240 |

FOREIGN PATENT DOCUMENTS

| | | |
|---|---|---|
| JP | 07-336679 | 12/1995 |
| JP | 2005-117680 | 4/2005 |
| JP | 2006-262278 | 9/2006 |
| JP | 2007-184871 | 7/2007 |
| WO | WO 2004/054270 | 6/2004 |

* cited by examiner

COMPRESSED IMAGE NOISE REMOVAL DEVICE AND REPRODUCTION DEVICE

CROSS-REFERENCES TO RELATED APPLICATIONS

This application relates to and claims priority from Japanese Patent Application No. 2008-195634, filed on Jul. 30, 2008, the entire disclosure of which is incorporated herein by reference.

TECHNICAL FIELD

The present invention relates to a digital video appliance for executing the reproduction of a digital compressed image.

BACKGROUND ART

As a background art in the present technical field, JP-A-6-70173 (Patent Document 1) exists, for example. In this patent publication, the following description has been given: "[Object] The occurrence of a ringing in a reproduced image is prevented. [Configuration] In an edge judgment unit 22, it is judged whether or not an edge is present from the state of an image obtained by decoding an encoded image for each block basis. Then, in a plane approximation unit 32, concerning each block which has the edge, the plane approximation is made with respect to domains positioned on both sides of the edge, thereby creating an approximate image. Moreover, this approximate image is DCT-transformed, thereby being transformed into the approximate image in a frequency domain. Furthermore, this frequency-domain approximate image is supplied to a calculation unit 38, where this image is added to the decoded image in the frequency domain with a predetermined internal-splitting ratio associated therewith. Namely, in the calculation unit 38, a high-frequency domain, which is lost in the quantization processing, is added to the decoded image. The lack of this high-frequency domain is a cause for the above-described ringing. Accordingly, the addition processing in the calculation unit 38 allows the prevention of the ringing in the reproduced image."

PRIOR ART DOCUMENTS

Patent Documents

Patent Document 1: JP-A-6-70173

SUMMARY OF THE INVENTION

Problem to be Solved by the Invention

In recent years, there has been a significant progress in the prevalence of digital broadcast. Then, in accompaniment with this progress, the HDTV (: High-Definition TV) image has already become available even at ordinary homes easily and casually. This digital image, which includes tremendous amount of information, is usually compressed using the moving-picture-compression-dedicated international standard scheme such as MPEG2 or H.264. In this compression, the reduction in the data amount is executed by applying the frequency transform to the image information, and cutting off the high-frequency component by the quantization. Namely, this reduction in the data amount based on the quantization results in the dropout of the high-frequency component in the compressed image. This dropout, however, gives rise to the occurrence of a blurring and mosquito noise of the compressed image.

With respect to the removal of these noises, the proposal has been made concerning the technique of predicting the reduced high-frequency component (JP-A-6-70173). In this patent, however, the noise reduction is executed by creating the approximate image using only the image information of the target blocks, and adding its high-frequency component. Depending on the accuracy of this approximate image, however, the following case is conceivable: Namely, the approximate image turns out to become an image which differs from the initial image (i.e., original image) before being image-compressed. As a result, the corrected image becomes different from the peripheral images, thereby bringing about a degradation in the quality of the reproduced image.

In particular, the control over the quantization width in the usual moving-picture compression is executed in such a manner that, based on the human's sense-of-sight characteristics, the quantization width is set largely with respect to the edge portions. Then, from this condition, it is conceivable that the accuracy of this approximate image becomes more degraded, and that the quality of the final corrected image also becomes more degraded.

It is desirable that, when reproducing a digital compressed image, the reproduced image of high picture-quality be reproduced by predicting with a high accuracy the high-frequency component which has been lost in the quantization processing. Accordingly, an object of the present invention is to reproduce the compressed image with the high picture-quality given thereto.

Means for Solving the Problem

In order to accomplish the above-described object, the configurations disclosed in the scope of the appended claims are employed.

Advantages of the Present Invention

According to the present invention, it becomes possible to reproduce the compressed image with the high picture-quality given thereto.

The objects, configurations, and effects other than the ones described above will become apparent from the following explanation of embodiments.

Figure 5:
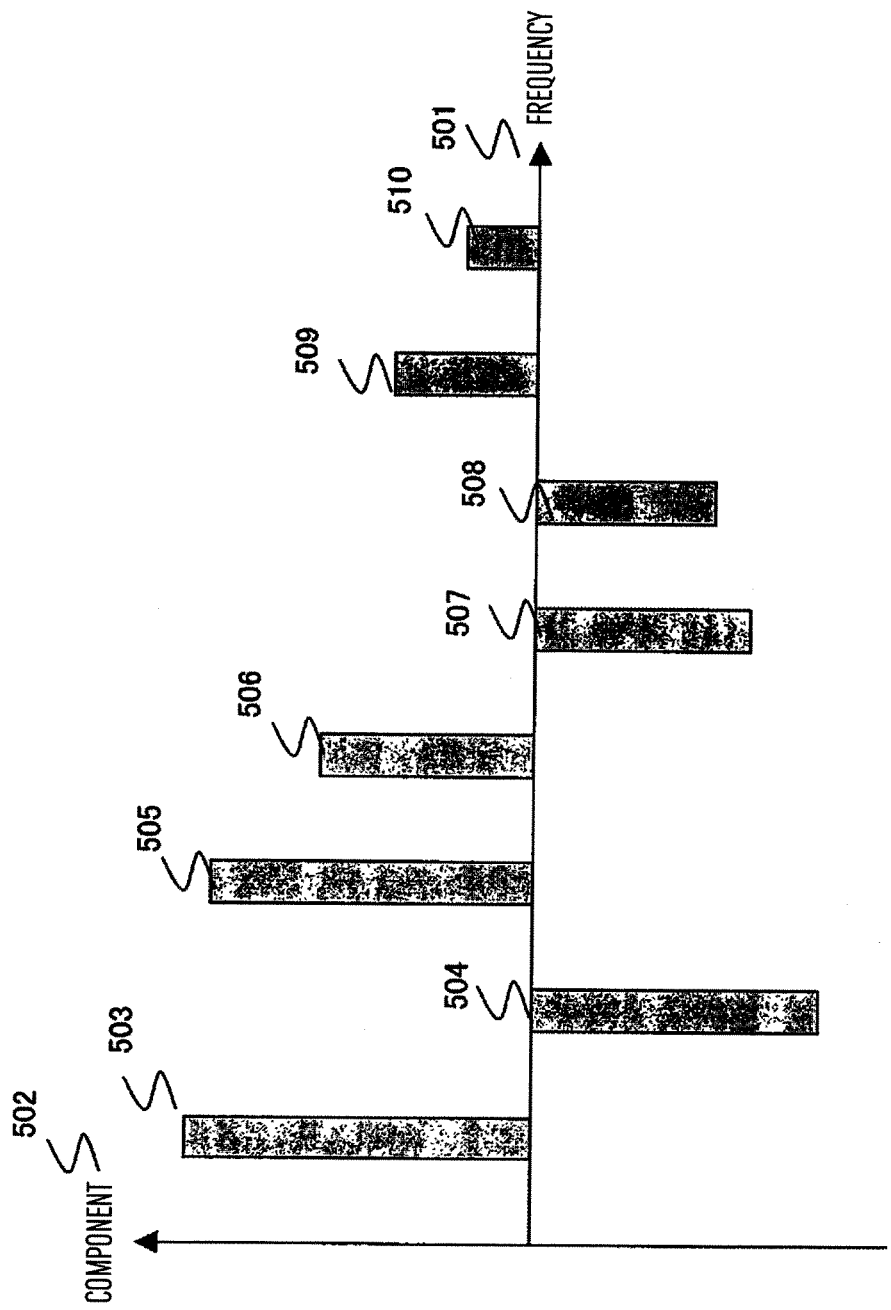
FIG. 5
This is a diagram for illustrating resultant respective signal components in a case where a signal hypothesized as an image signal is frequency-transformed.

This is a diagram for illustrating an intuitive image in which the respective signal components illustrated in FIG. 5 are quantized in the second embodiment.

FIG. 7

This is a diagram for illustrating the configuration in the case where the peripheral-block data is used in the second embodiment.

FIG. 8

This is a diagram for illustrating the configuration of the noise removal using an original-image evaluation-value calculation in the third embodiment.

FIG. 9

This is a diagram for illustrating a concrete example of the summarization of coefficients into a table and the correction of the coefficients.

FIG. 10

This is a diagram for illustrating the configuration of a fourth embodiment.

FIG. 11

This is a diagram for illustrating the configuration of a fifth embodiment.

MODE FOR CARRYING OUT THE INVENTION

Hereinafter, referring to the drawings, the explanation will be given below concerning embodiments of the present invention.

Embodiment 1

Figure 1:
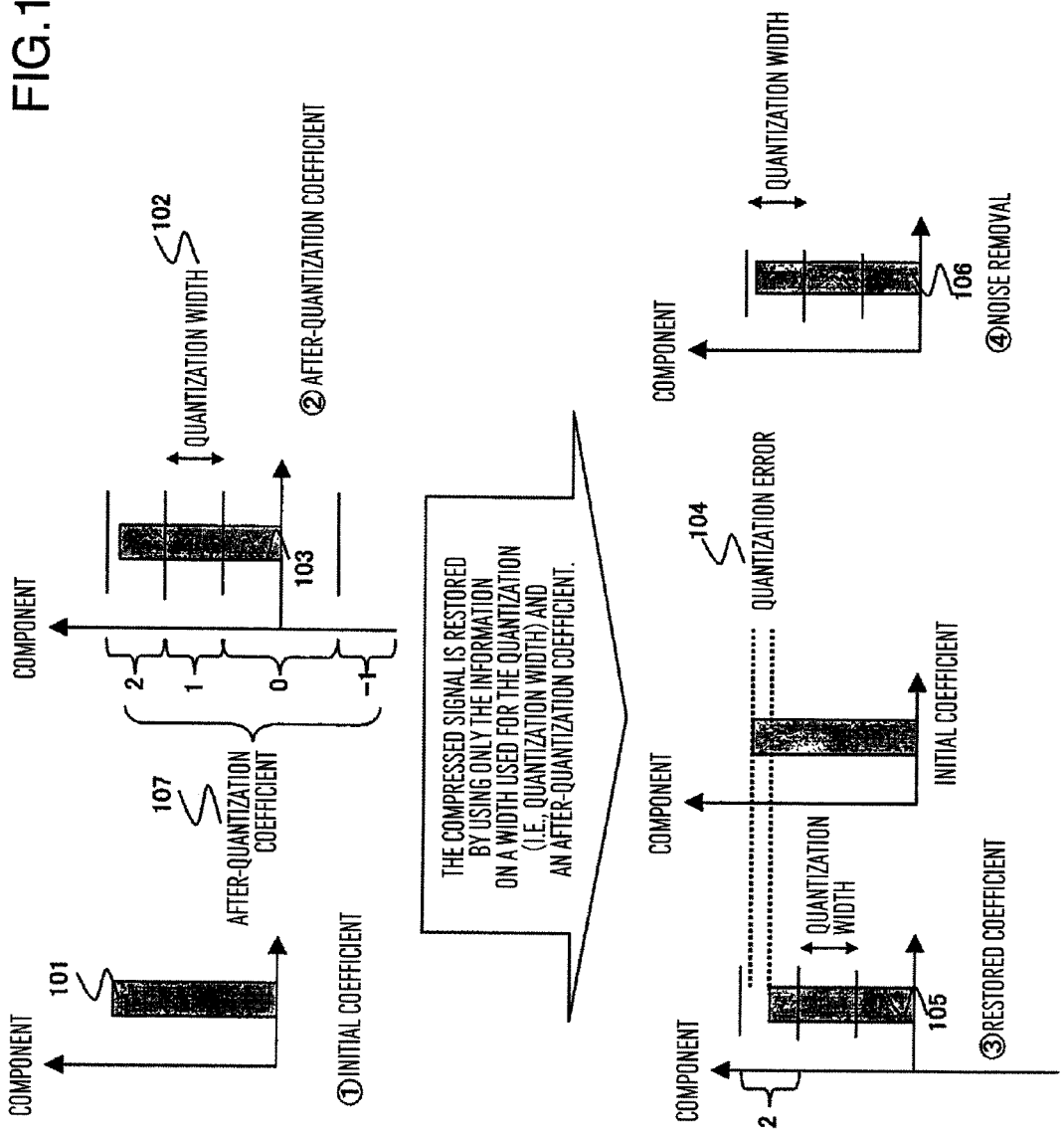
FIG. 1
This is a diagram for illustrating one aspect of the basic concept of the present invention in a first embodiment.

Referring to FIG. 1, the explanation will be given below regarding the first embodiment. The present embodiment explains one aspect of the basic concept of the present invention. FIG. 1 is a diagram for illustrating the one aspect of the basic concept of the present invention. A numeral (1) in FIG. 1 denotes an initial coefficient 101, which indicates the coefficient having a certain component (i.e., value). A numeral (2) in FIG. 1 illustrates an example where the initial coefficient 101 is quantized based on a certain quantization width 102. The quantization means that a continuous amount such as analog data is approximated into a discrete value such as digital data. The quantization of the initial coefficient 101 based on the quantization width 102 approximates the component of the initial coefficient 101, thus approximating the component into an after-quantization coefficient 107.

When digital data is compressed, the compression processing for the tremendous data amount is implemented by using this quantization width and after-quantization coefficient instead of using the initial coefficient with no change made thereto.

Next, the explanation will be given below concerning a restoration method for restoring the digital data which is compressed by this quantization. In the restoration, a restored coefficient 105 is restored based on the quantization width and the after-quantization coefficient. This restoration processing is referred to as "inverse quantization" in some cases. This processing is an example where the value of the restored coefficient is restored to an intermediate value in the domain of the quantization width. It is defined in advance on both of the quantization side and the inverse-quantization side at which position of this quantization width the value should be restored.

The difference between the restored coefficient, i.e., this restored component, and the initial coefficient before being restored is referred to as "a quantization error 104". This is a noise which is caused to occur by the digital-data compression. The general relationship between the quantization width and the data compression ratio is as follows: Widening the quantization width heightens the data compression ratio, but increases the quantization error. Meanwhile, narrowing the quantization width decreases the quantization error, but lowers the data compression ratio.

A concrete example of the processing up to here is indicated: For example, consideration is given to a case where, when the original component had a value of 55, the quantization will be executed based on the quantization width 20. In this case, the information to be used for the compression becomes the after-quantization coefficient 2 and the quantization width 20. Then, executing the inverse quantization based on this information causes the restored coefficient to become equal to 50, if the value of the restored coefficient is restored to the intermediate value of the quantization width. As a result, it turns out that (initial coefficient) 55−(restored coefficient) 50=5 occurs as the quantization error.

The removal of this quantization error is executed based on peripheral information on the restored coefficient and the property of its component. If, however, the component of the restored coefficient is corrected for the noise removal, the correction of the component inside the quantization-width domain used for the inverse quantization becomes necessary as indicated by a reference numeral 106. The reason for this necessity is as follows: If, because of the processing for the quantization-error removal, the component of the restored coefficient has exceeded the quantization-width domain used for the inverse quantization and indicated by 106, this phenomenon means that the restored coefficient has become a coefficient (i.e., image) which differs from the initial coefficient (i.e., original image). Consequently, executing the noise removal to restore the initial coefficient faithfully makes it important that the noise removal based on this principle be executed, i.e., the noise removal within the range which has not exceeded the quantization-width domain.

Embodiment 2

The present embodiment explains an example where the MPEG2 (ISO/IEC 13813-2) scheme is employed as the moving-picture compression scheme. Not being limited to the MPEG2 scheme, however, the present invention is also made implementable by the other compression schemes (e.g., H.264, MPEG1, MPEG4, JPEG, and VC1).

First, the explanation will be given below regarding the outline of the present embodiment. At the time of the image compression (encoder side), the image information is decomposed into frequency components, then being quantized. The quantization width at that time is stored into the stream as a quantization value, a quantization matrix, and an intra-DC quantization width. On the decoder side, the information on the after-quantization coefficient and the quantization width can be acquired. Accordingly, it is possible at the time of the encoding to estimate within which value's range the coefficient has existed at the time of the quantization. When executing the noise removal on the decoder side, correcting the value of the coefficient after the inverse quantization is executed so that the value falls within the range of its quantization width.

FIG. 5 illustrates resultant respective signal components (503 to 510) in a case where a signal hypothesized as an image signal is frequency-transformed. For simplicity, FIG. 5 indicates an example where the signal is transformed into 8-dimensional frequency components. In the MPEG2, the transform into 64 dimensions is executed by using a frequency transform which is referred to as "DCT (Discrete Cosine Transform)", and which executes the transform on each 8-pixel×8-pixel block basis. A transverse axis 501 in FIG. 5, which denotes the frequency, indicates that the frequency components existing in the righter direction are higher-frequency components. A longitudinal axis 502 in FIG. 5, which denotes values of the respective frequency components, indicates that, as the absolute value of a frequency component is larger, the frequency component exists in a larger amount. Next, the quantization processing is executed with respect to these frequency components in the image compression.

Figure 6:
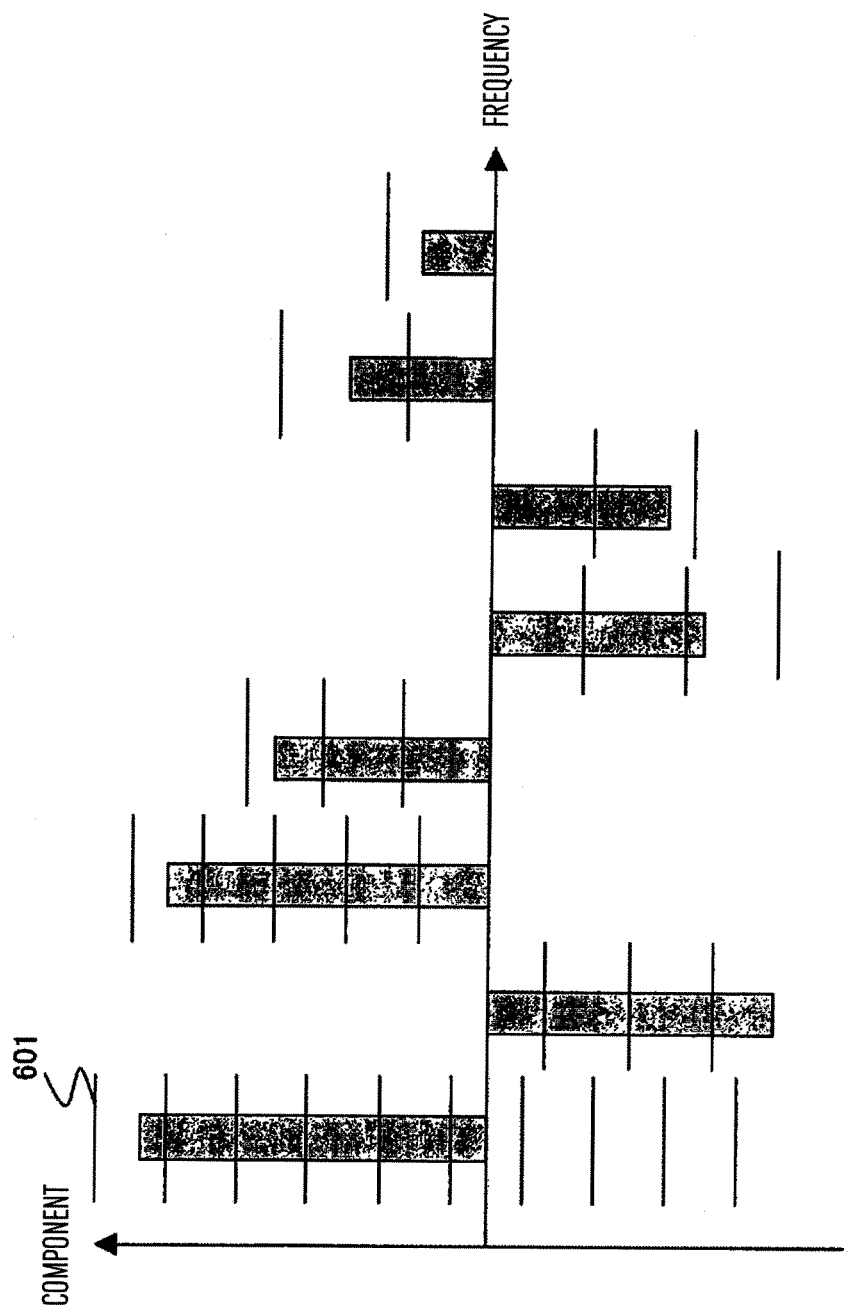
FIG. 6

FIG. 6 illustrates an intuitive image in which the respective signal frequency components illustrated in FIG. 5 are quantized. The quantization is executed on each component basis such that a quantization width 601 is calculated individually for each component. The quantization width 601 is determined using the quantization value and the quantization matrix. Here, the quantization value is given for each macroblock, i.e., the processing unit for executing the encoding, and the quantization matrix is given for each picture. In the image compression, it is generally preferable that, as a frequency component is the higher-frequency component, the quantization width corresponding thereto is made wider. The image compression is implemented by executing the quantization with this quantization width and individually for each component, and forming the after-quantization coefficient and the quantization width into the stream.

The decoding (i.e., restoration, extension) of this stream is executed as follows: This stream is restored to the image information by restoring the frequency components using the after-quantization coefficient and the quantization width, and inversely frequency-transforming these frequency components. Incidentally, the information needed for executing the quantization in the MPEG2 standard are specified as the quantization value (quantizer_scale), the quantization matrix (non_intra/intra_quantizer_matrix), the intra-DC quantization width (intra_dc_precision), and Intra/Inter switching information (macroblock_infra). The information needed for executing the quantization also becomes the target in the other standards.

In these before-image-compression image and after-image-restoration image, the noise is caused to occur by the quantization error as was explained in the first embodiment. This noise is generally referred to as "mosquito noise or block noise". The removal of this noise is made implementable by applying each type of filter onto the restored image. The after-restoration image, however, becomes an image which differs from the before-compression image. This phenomenon happens, unless the restored image (whose noise removal is to be executed) is corrected within the range of the quantization width used for the compression. Executing the noise removal to restore the before-compression image faithfully requires that the noise removal based on this principle be executed.

Figure 2:
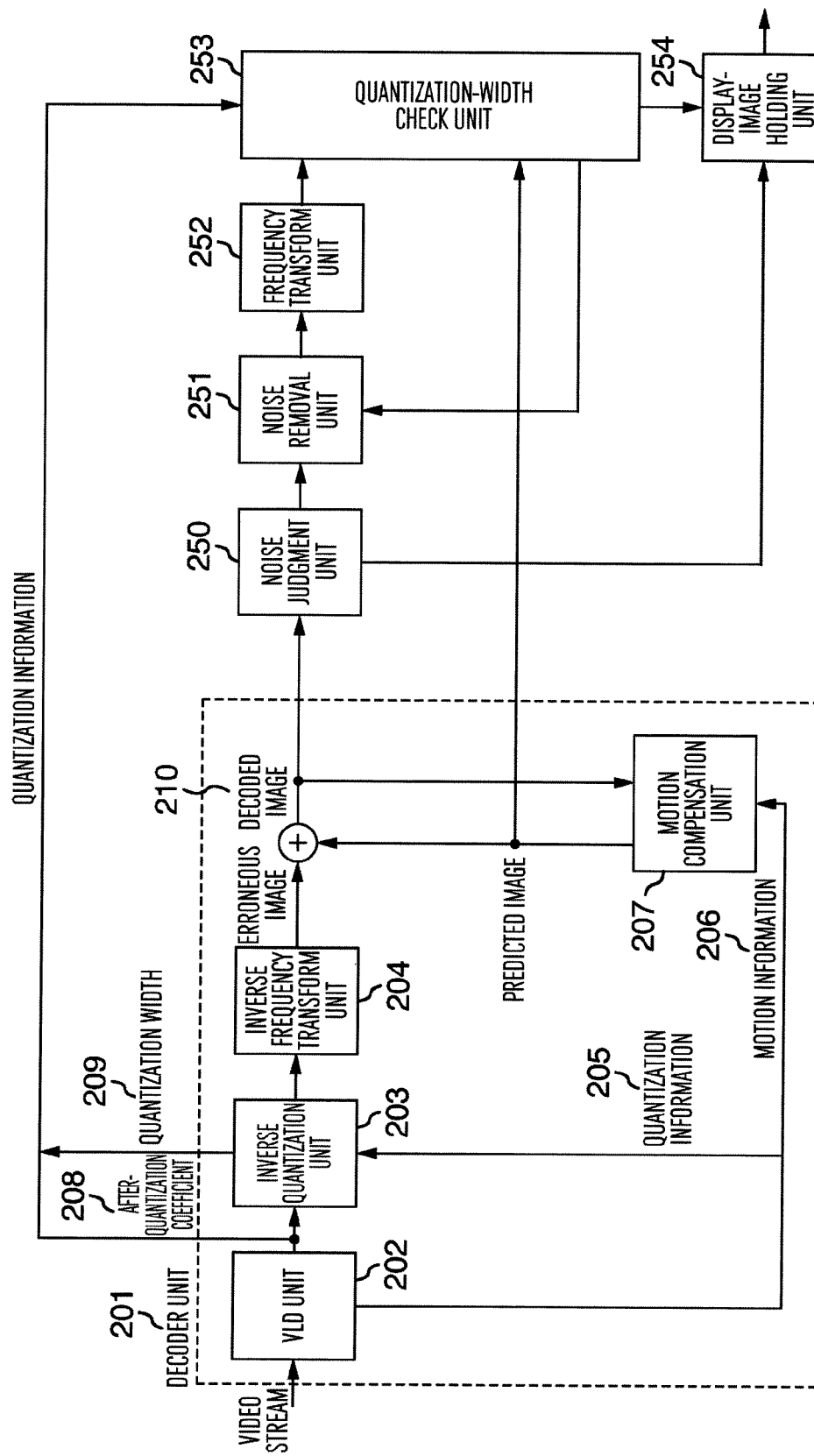
FIG. 2
This is a diagram for illustrating the configuration of a second embodiment.

FIG. 2 illustrates the configuration of the present embodiment. The left portion in FIG. 2 denotes a decoder unit 201 of the MPEG2. A Video stream of the MPEG2 is inputted into a VLD (: Variable Length Decoding) unit 202. The VLD unit 202 applies the variable-length inverse encoding to this stream, thereby transforming this stream to quantization information 205 for calculating after-quantization coefficient 208 and quantization width 209, and motion information 206 such as motion vectors. The after-quantization coefficient 208 is inversely quantized by an inverse quantization unit 203, then being inversely frequency-transformed by an inverse frequency transform unit 204. The quantization information 205, which becomes the quantization width 209, is outputted from the VLD unit 202 to the inverse quantization unit 203 and an information holding unit. The motion information 206 is outputted to a motion compensation unit 207. Based on the motion information 206, the motion compensation unit 207 generates a predicted image from the previous decoded image. Moreover, the unit 207 adds the predicted image to the information from the inverse frequency transform unit 204, thereby generating a decoded image 210 which is to be displayed. This decoded image 210 is held in the motion compensation unit 207 so as to be used as a reference image for the next picture. The description given so far is the explanation of the decoder unit 201. The operation of the decoder unit 201 becomes basically the same as that of the usual MPEG2 decoder. This decoded image 210, which is decoded based on the MPEG2, contains the mosquito noise or the block noise. Accordingly, the noise removal will be executed in the right-side block. The present noise removal will be executed with respect to each 8-pixel×8-pixel block, i.e., the unit of the DCT in the MPEG2 decode processing.

A noise judgment unit 250 will be explained below: The decoded image 210, which is decoded by the decoder unit 201, is inputted into the noise judgment unit 250. The noise judgment unit 250 makes a judgment as to whether or not the noise removal should be executed with respect to a target block. Here, this judgment is made in the decode-executing block unit (i.e., 8-pixel×8-pixel unit in the MPEG2), and based on the decoded-image information, quantization information, picture information, and peripheral-image information. Moreover, when a compressed image contains an edge image, the noise of the compressed image is caused to occur in a significantly large amount. This is because the edge contains a significantly large number of high-frequency components, and because the noise is caused to occur by the dropout of the high-frequency components resulting from the quantization. Accordingly, in the present block, an analysis is made as to whether or not the edge information exists for the decoded image 210 generated by the decoder unit 201. As this analysis method, the edge is detected as follows, for example: The difference between the pixels is assumed. Then, if the difference value is larger than a certain threshold value, the edge is judged to exist in the target block. Also, an edge-detection-dedicated filter may be used. Also, a technique is conceivable where the noise judgment is made by analyzing the quantization value of the target block. This is because there exists a characteristic that, because of the human's sense-of-sight characteristics, the high-frequency noise is inconspicuous in the moving-picture encoding, and there exists a tendency that the block containing a steep edge makes the quantization value larger. Consequently, if the quantization value of the target block is large, this target block may be judged to contain the edge information. Furthermore, the high-accuracy edge detection is made implementable by making the overall judgment using both of the information (i.e., image information and quantization information).

Also, there exists a characteristic that, in a moving picture, the noise is inconspicuous in a portion at which the image motion is rapid and violent. Accordingly, the noise removal may be judged not to be executed in the portion at which the image motion is rapid and violent.

Also, there are some cases where, because of a preference of the user, there exists a mode in which the noise removal will not be executed. On this occasion, the noise removal may be judged not to be executed in accordance with a user specification like this.

A noise removal unit 251 will be explained below: In the present block, the noise removal is executed only for a block whose noise deletion has been judged to be executed by the noise judgment unit 250. Its noise removal method is to predict the data whose dropout has been caused to occur by the quantization in the frequency domain at the image compression time. The basic concept of the present technique will be described below: With respect to the decoded image, a processing for making the edge more conspicuous, and removing the noise is executed. This processing is executed based on estimation of the graphics pattern from the peripheral images, and classification/separation of the edge and the noise. This operation brings about the generation of a predicted image which has been subjected to the noise removal. The information utilization from the peripheral images will be described later.

A frequency transform unit 252 will be explained below: In the present block, the frequency transform is applied to the image which has been subjected to the noise removal. As its frequency transform scheme, the scheme corresponding to the inverse frequency transform is employed. In the case of the MPEG, the DCT is employed.

A quantization-width check unit 253 will be explained below: In the present block, a check is made from the after-quantization coefficient and the quantization width as to whether or not the after-noise-removal image exists within the domain of the quantization width.

If, as a result of this quantization-width check, all the coefficients fall inside the quantization-width domain, the correction is judged to be valid. Accordingly, the corresponding image is transferred to a display-image holding unit 254 as a display image. Meanwhile, if, as a result of this quantization-width check, all the coefficients have been found to fall outside the quantization-width domain, this information may be transferred to the noise removal unit 251 to execute the noise removal again. Otherwise, the before-noise-removal image may be transferred to the display-image holding unit 254 as the display image.

Figure 4:
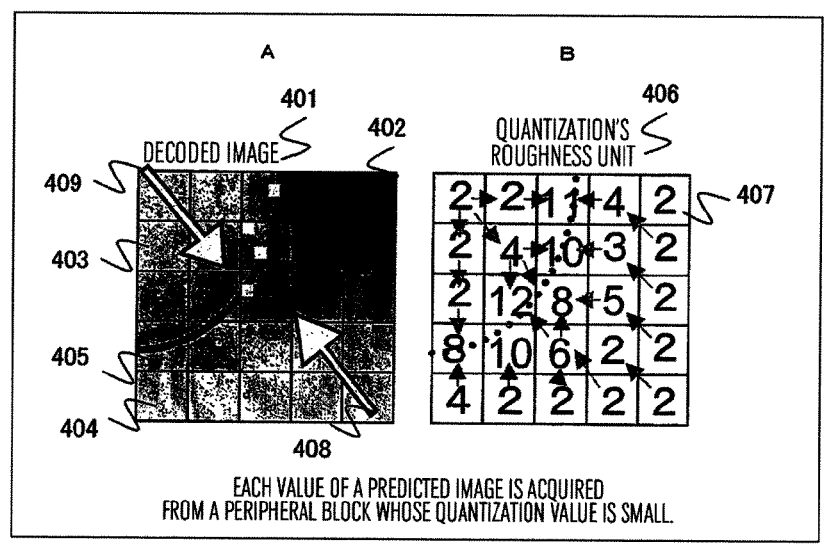
FIG. 4
This is a diagram for illustrating the utilization of peripheral-block data in the second embodiment.

Next, referring to FIGS. 4A and 4B, the explanation will be given below regarding the utilization of the peripheral-block data. FIGS. 4A and 4B illustrate a decoded image 401 whose decoding is over. The decoding is executed in the unit of a rectangular macroblock 402. The quantization values can also be set with this macroblock unit employed. FIG. 4A is a scene where a background 404 and a certain physical object 403 are photographed. A quantization noise 405 is caused to occur in a large amount in a macroblock which contains both the background 404 and the physical object 403. FIG. 4B illustrates an example of quantization's roughness unit 406 of the quantization values 407 at this time. The quantization's roughness unit indicates each quantization value which has been set at the time of the encoding. It is general that, based on the human's sense-of-sight characteristics, the quantization is executed in such a manner that the quantization values are set more finely in a flatter portion, and are set roughly in an edge portion. In a case like this, with respect to the information utilization of a peripheral block for executing the noise removal of a certain block, the utilization of the information from a block whose quantization values are more or less small results in a higher possibility of becoming capable of acquiring effective information. The reason for this fact is as follows: Namely, it is conceivable that, in the block whose quantization values are more or less small, there is less dropout of the high-frequency data, and that the quality of the reproduced image is more or less satisfactory. Also, in FIG. 4A, with respect to the block containing the background 404 and the physical object 403, executing the noise removal by using background information 408 as the background 404 and physical-object information 409 as the physical object 403 makes it possible to execute the noise removal with a higher noise-removal efficiency implemented. Concretely, this peripheral information is used as the information at the time when the predicted image is generated by the noise removal unit. Also, in addition to this technique using the peripheral information, the other effective techniques mentionable are a technique using past or future frame information, a technique using luminance or color-difference information, and so on.

Figure 7:
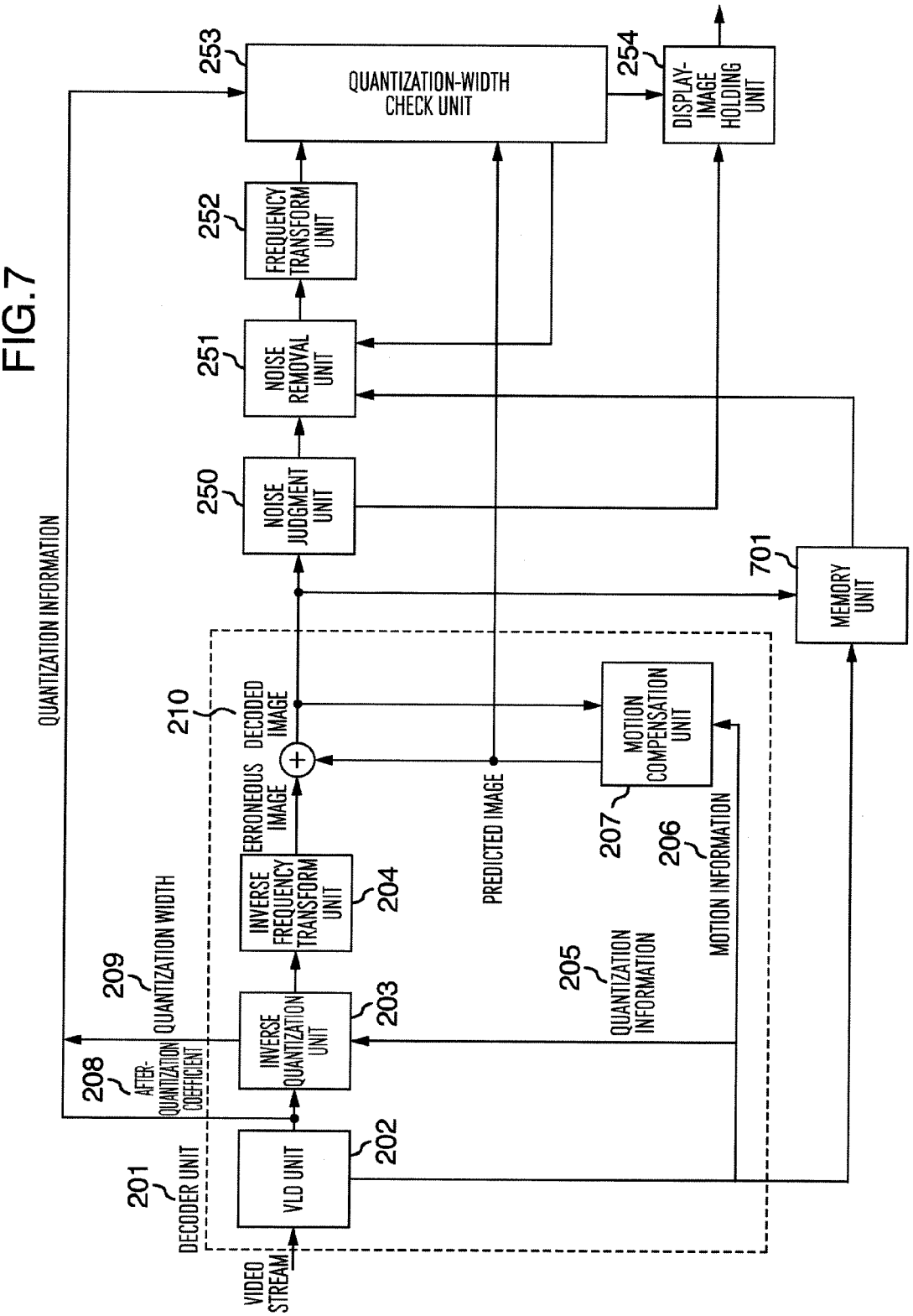

FIG. 7 illustrates the configuration for allowing implementation of the utilization of the peripheral-block data. The quantization values and the decoded image are held in advance by newly adding a memory unit 701 to the configuration in FIG. 2. Then, the quantization values and the decoded image are used in the noise removal unit.

An after-noise-removal frame may be held into this memory unit 701 so as to be used for the noise removal of the subsequent frames. In this case, the motion compensation is executed to the after-noise-removal image by using the motion information. In this way, the predicted image is generated, thereby executing the noise removal.

Also, the quantization values may be held into this memory unit 701 so as to be used for the noise removal. The magnitudes of the quantization differ between I-pictures and P/B pictures. Accordingly, by executing the noise removal by continuously using the quantization values in the I-pictures, it becomes possible to process the noise removal on each picture basis in an equalized manner. This feature allows implementation of the high-picture-quality noise removal in the moving pictures.

Embodiment 3

The noise removal in the second embodiment has been configured as follows: Namely, the decoded image is subjected to the noise removal. Moreover, the check is made as to whether or not the resultant after-noise-removal image has fallen within the quantization width. In a third embodiment, however, the explanation will be given concerning a configuration where the correction is made on the frequency components while the decoding is underway.

Figure 3:
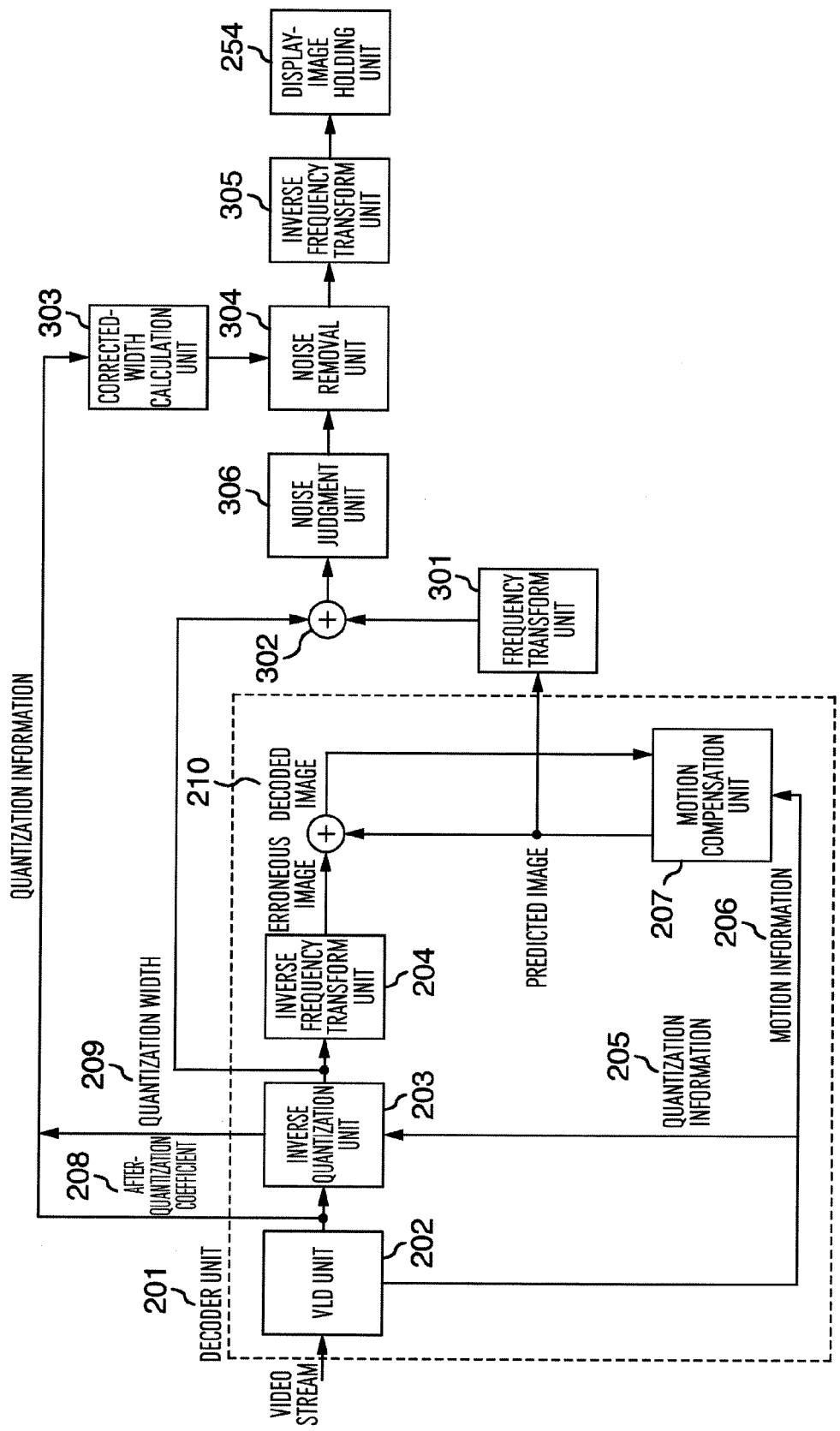
FIG. 3
This is a diagram for illustrating the configuration of a third embodiment.

FIG. 3 illustrates the configuration of the present embodiment. A decoder unit 201 in the drawing is basically the same as the one in the second embodiment.

A frequency transform unit 301 will be explained below: The frequency transform unit 301 applies the frequency transform to the predicted image outputted from the motion compensation unit 207. As its frequency transform method, the technique corresponding to the inverse frequency transform unit 204 is employed. In the case of the MPEG the DCT is employed.

Furthermore, an addition 302 is executed between the output of the frequency transform unit 301 and the output of the inverse quantization unit 203. This addition creates information which is basically the same as the information acquired by DCT-transforming the decoded image. The operation in 301 and 302 is an operation for acquiring the decoded image's frequency-transformed information. Accordingly, this operation is also allowed to be the scheme whereby the DCT is applied to the decoded image created by the decoder unit.

A corrected-width calculation unit 303 will be explained below: The corrected-width calculation unit 303 acquires information on the after-quantization coefficient and the quantization width from the decoder unit. Subsequently, the unit 303 calculates the corrected width of the decoded image's frequency components which does not exceed the quantization-width domain.

An inverse frequency transform unit 305 will be explained below: The present block is a block for generating a display image by inversely frequency-transforming the noise-removal-executed frequency components.

The display-image holding unit 254 is a block for holding the display image.

A noise judgment unit 306 will be explained below: The noise judgment unit 306 makes a judgment as to whether or not the noise removal should be executed with respect to a target block. Here, this judgment is made employing, as its input, the information which is generated by the adder 302 by applying the DCT to the decoded image. Basically speaking, the unit 306 has basically the same function as the noise judgment unit 250 in the figure. In this noise judgment unit 306, however, the input is the frequency components, and accordingly the judgment becomes a one on the frequency components.

In the present block, the inverse frequency transform is executed, and the noise judgment may be made in the image domain. Also, it is allowable to make the judgment using a peripheral block, or a past or future block. In that case, however, there arises a necessity for using a memory and holding in advance the information needed for the judgment.

A noise removal unit 304 will be explained below. The noise removal unit 304 executes the noise removal with respect to the information on the decoded image's frequency components outputted from the addition unit 302. The width of the correction made for the values based on the noise removal in the frequency components is set such that the width falls within the corrected width calculated by the corrected-width calculation unit 303. The correction methods which are conceivable at this time are as follows:

The components of the original image such as a natural image are classified into patterns. Moreover, a pattern which is the closest to the decoded image's frequency components is selected, then being used for the correction.

Figure 8:
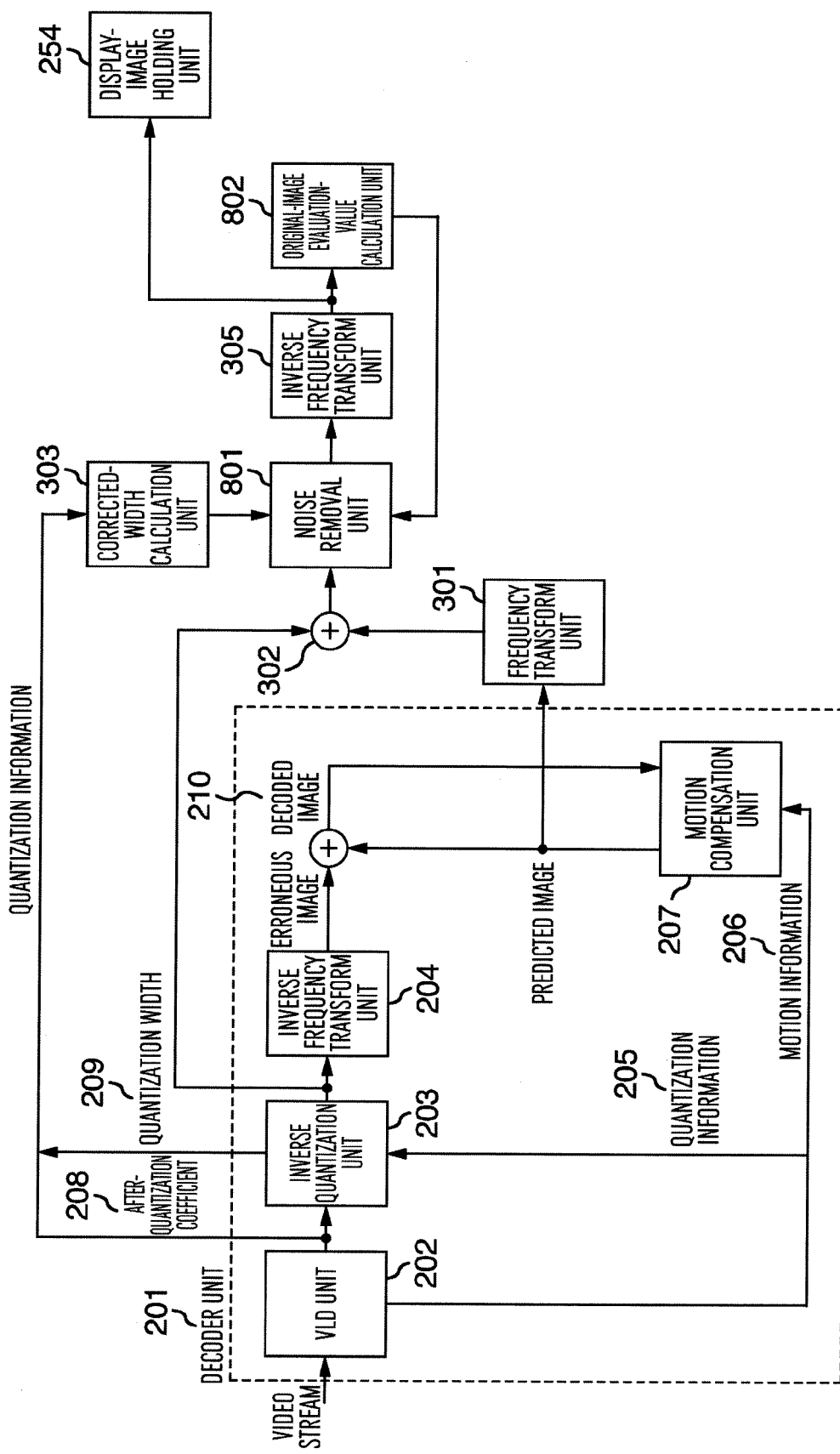

A method which will be indicated in FIG. 8 (which will be described later)

The detailed explanation will be given below concerning the former method. This is the method where the noise removal is executed on the frequency components. In general, a natural image or an artificial image is a clear image with less noise. Frequency-transforming these images using the frequency transform such as the DCT brings about the occurrence of distinctive transform results. The coefficients resulting from frequency-transforming the various patterns such as natural image or artificial image are summarized into a table. Subsequently, a pattern which is the closest to the after-quantization coefficients is searched for from the table, then being used for the correction of the after-quantization coefficients.

Figure 9:
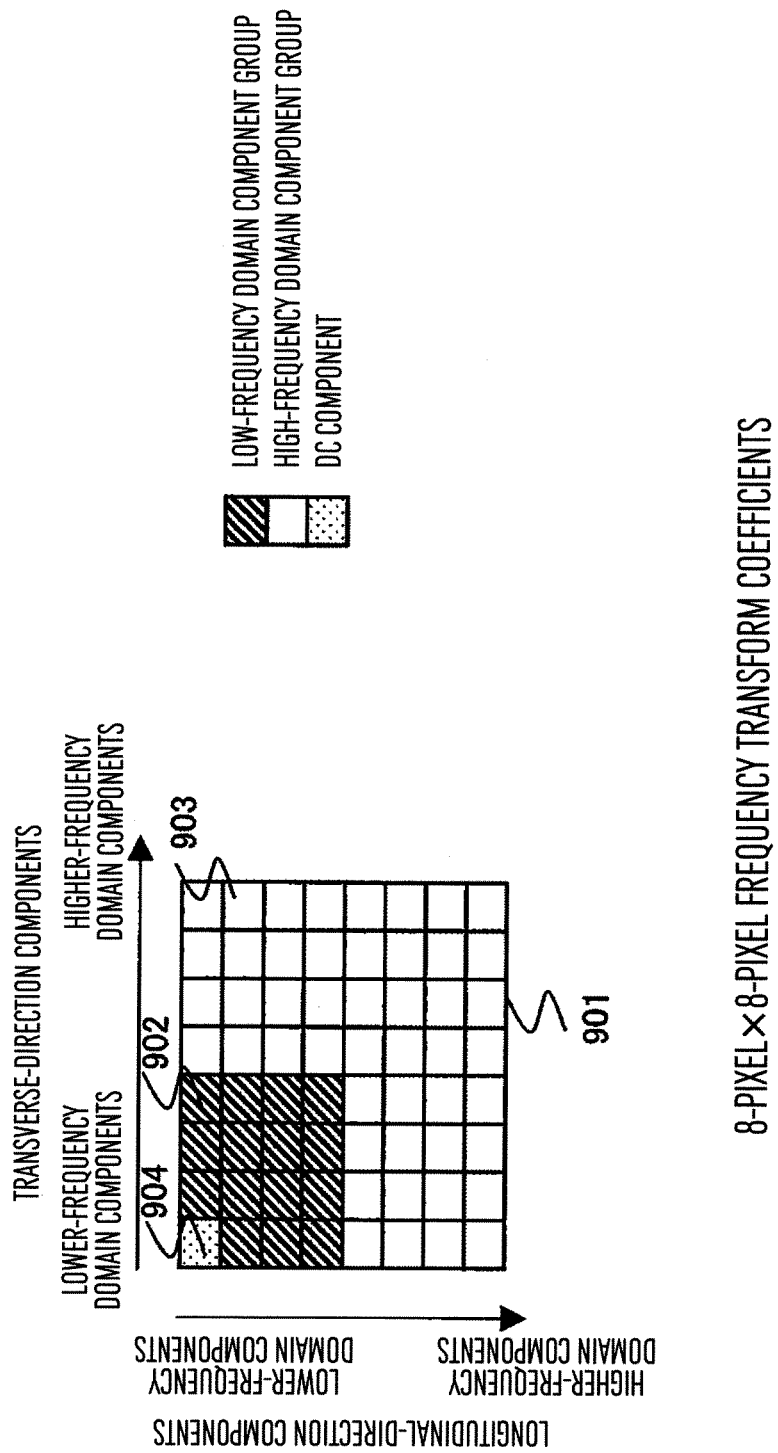

FIG. 9 illustrates an example of the summarization of the coefficients into a table and the correction of the coefficients. A reference numeral 901 denotes the frequency transform coefficients. In the present example, since the case where the 8-pixel×8-pixel DCT is used is assumed, the 64 coefficients exist in total. Assuming that the top-left coefficient is a direct-current component 904 (: DC component), the right direction indicates transverse-direction components ranging from the lowest-frequency domain component to the highest-frequency domain component. The downward direction indicates longitudinal-direction components ranging from the lowest-frequency domain component to the highest-frequency domain component. When executing the summarization of the coefficients into a table, the DCT is applied to a natural image or an artificial image. Then, based on the combination of a low-frequency domain component group 902 (i.e., oblique-line blocks in the drawing) which is a certain cluster of the low-frequency domain components, the components of a high-frequency domain component group 903 (i.e., plain blocks in the drawing) are summarized into the table. The employment of a configuration like this is desirable. The reason for this is as follows: Namely, there are many cases where, in the after-quantization coefficients, many of the high-frequency domain components are deleted by the quantization, but many of the low-frequency domain components remain. Also, this classification/separation of the low-frequency domain component group 902 and the high-frequency domain component group 903 can be determined by a memory amount of the table that can be ensured. If the table with a large memory amount can be ensured, the low-frequency domain component group 902 needs to be made more or less wider. In the opposite case, the low-frequency domain component group 902 needs to be made more or less narrower. Making the low-frequency domain component group 902 wider makes it possible to execute the correction of the coefficients more accurately.

Next, the explanation will be given below regarding the correction method for the after-quantization coefficients with the use of this table. The high-frequency domain component group is extracted by making reference to this table with the use of the low-frequency domain component group coefficients of the after-inverse-quantization coefficients at the time of the decoding. Then, the values of the high-frequency domain component group of the after-inverse-quantization coefficients are corrected. Especially when the values of the high-frequency domain component group of the after-inverse-quantization coefficients are equal to zero, it is effective to replace the values by making reference to the values on the table. At this time, it is desirable that the confirmation of the quantization width explained in the first embodiment be also executed for each high-frequency domain component group.

Also, the correction of the after-inverse-quantization coefficients may also be executed by making reference to the information on a similar block from the frequency components of a peripheral block or a past or future image as was illustrated in FIGS. 4A and 4B.

Next, the explanation will be given below concerning the latter method described earlier. FIG. 8 illustrates the configuration of the noise removal using an original-image evaluation-value calculation. The block of an original-image evaluation-value calculation 802 is newly added to the configuration illustrated in FIG. 3.

Taking advantage of an evaluation function, the original-image evaluation-value calculation unit 802 calculates an evaluation value for the display image inputted from the inverse frequency transform unit 305. The evaluation function desirable as this evaluation function is a one which exhibits a more distinctive numerical value for the image such as natural image or artificial image. Also, in calculating the evaluation function, the evaluation function may be calculated using not only the information inside a processing target block alone, but also the information inside a peripheral block or a past or future frame. In that case, the data to be utilized for the evaluation-value calculation is held in advance, using a memory in a separate manner.

A noise removal unit 801 corrects the information on the decoded image's frequency components generated by the addition unit 302. This correction is executed within the corrected width which has been calculated by the corrected-width calculation unit 303, and within which the frequency components are modified by the noise removal unit. Moreover, the inverse frequency transform is executed, and then the evaluation value is calculated in the original-image evaluation-value calculation unit 802. Furthermore, the evaluation value calculated is feed-backed to the noise removal unit 801 again. This operation is executed every time the decoded image's frequency components are corrected. In addition, the frequency components, in which the evaluation value exhibits and reflects the highest degree of fidelity to the original image, are employed as the after-correction components.

Next, the explanation will be given below regarding the utilization of the peripheral-block information at the time of generating the predicted image. In the moving-picture encoding, the quantization values are switched in accordance with the block unit inside the image. For example, in the MPEG2, the quantization values are switched in accordance with the 16-pixel×16-pixel block unit. The execution of this switching allows the image compression to be implemented in compliance with a tendency of the image inside the frame. By the way, it is conceivable that, in a block whose quantization values are small, there is less dropout of the high-frequency data, and that the quality of the reproduced image is satisfactory. Accordingly, adjacent blocks adjacent to a processing target block are investigated. Then, if there exists an adjacent block whose quantization values are small, this adjacent block's information is utilized in a positive way. Concretely, in the generation of the predicted image, the values of adjacent pixels of the adjacent block whose quantization values are small are set as the values of the predicted image of the present block. The employment of this setting also makes it possible to expect an effect of reducing a block distortion which occurs between the blocks. The quantization information on the peripheral block is implemented by the information holding unit. FIG. 3 illustrates its example. Taking the quantization's roughness unit of the quantization values into consideration, the image data on the peripheral block is utilized for the decoded image.

Embodiment 4

The present embodiment describes the configuration of a case where the H.264 (ITU-T H.264)/MPEG4 AVC (ISO/IEC 14496-10) or the VC1 (i.e., moving-picture compression scheme developed by Microsoft, and created by standardizing Windows® Media Video 9) is employed. In these moving-picture encoding standards as well, the initial noise removal based on the principle of the first embodiment is executed. Also, the concept of the scheme of the present embodiment becomes substantially the same as the concept of the scheme of the second embodiment. The encoding standards employed therebetween, however, are different from each other, and thus the encoding tools are different from each other. As a result, the scheme of the second embodiment cannot be directly applied to the present embodiment. Consequently, the specifically detailed explanation will be given below concerning portions of the distinction therebetween.

In these standards, a filtering processing which is referred to as "in-loop filter (deblocking filter)" is carried out to the decoded image.

Figure 10:
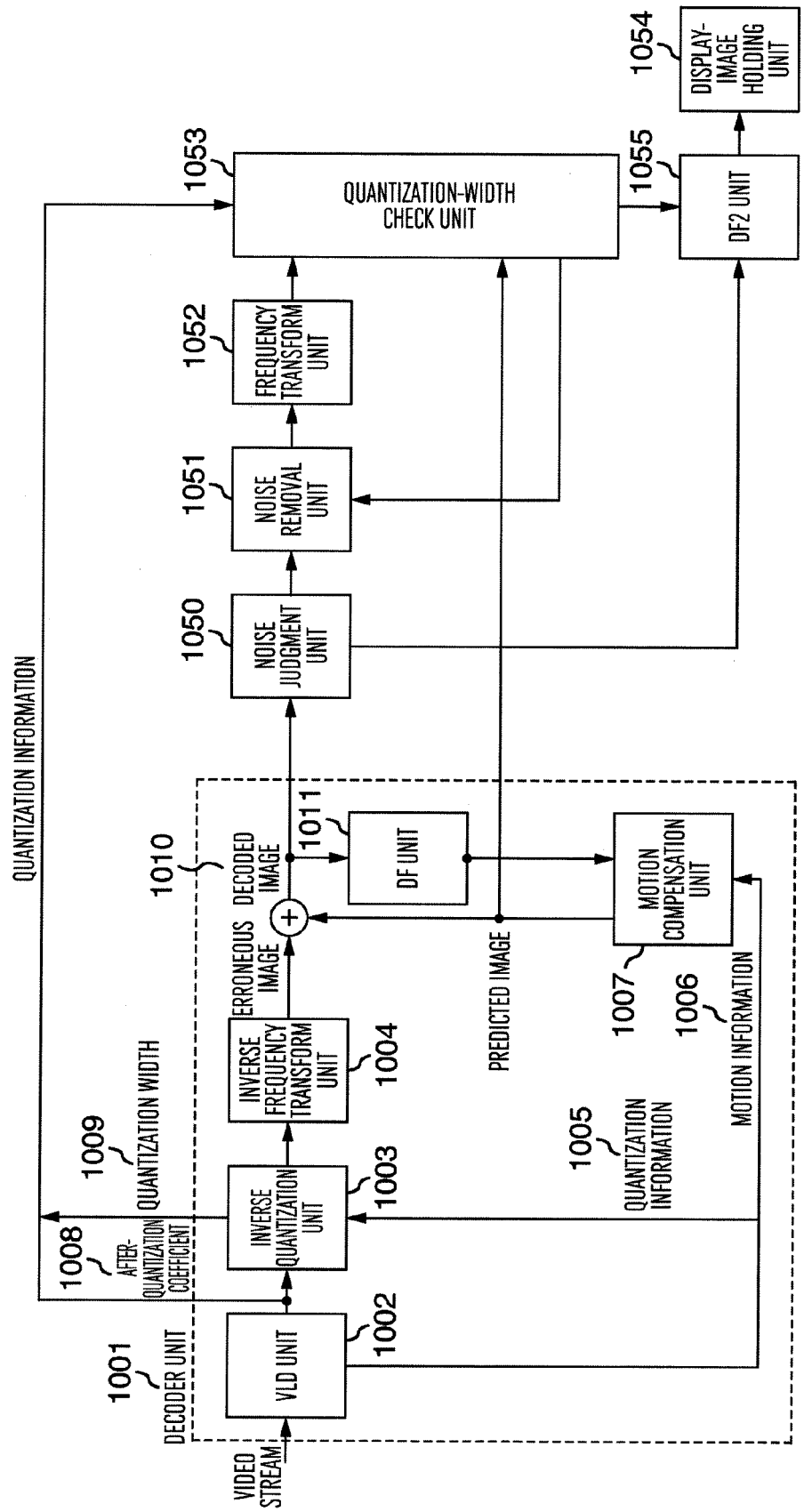

FIG. 10 illustrates a configuration diagram of the present embodiment. In a VLD unit 1002, a Video stream is subjected to the decoding for the variable-length encoding, thereby being divided into image data, quantization information 1005 for calculating quantization value and quantization width such as matrix information, motion information 1006, and sub information such as block-mode information. The image data is inversely quantized by an inverse quantization unit 1003, then being inversely frequency-transformed by an inverse frequency transform unit 1004. At this time, the quantization information is supplied to the inverse quantization block. Incidentally, in the H.264 or the VC1, the block partition size becomes the variable size ranging from the 4-pixel× 4-pixel size to the 8-pixel×8-pixel size. It is assumed that the information on the size is supplied from the VLD block to each block.

Meanwhile, the motion information 1006 is supplied to a motion compensation unit 1007, then being subjected to the motion compensation. A decoded image 1010 is generated by executing an addition of the resultant motion-compensated data and information from the inverse frequency transform unit 1004.

Also, in the standard of the present embodiment, there exists a mode which is referred to as "Intra prediction". In this Intra prediction, the prediction encoding is executed using only the information inside the decoded frame. In the present embodiment, however, the example is given where this Intra-prediction processing is also executed in the motion compensation unit 1007. Moreover, this decoded image 1010 is subjected to the block noise removal in a DF unit 1011 for executing the deblocking filter. These processings, which are designed by imaging the H.264/VC1-based usual decoding, are integrated as a decoder unit 1001.

The decoded image 1010 is inputted into a noise judgment unit 1050, where a judgment is made as to whether or not to execute the noise removal to the decoded image. Moreover, the noise removal is executed in a noise removal unit 1051. Furthermore, the frequency transform is applied to the decoded image in a frequency transform unit 1052, and the check for the quantization width is made in a quantization-width check unit 1053. In addition, the image is subjected to the deblocking filter in a DF2 unit 1055, then being held into a display-image holding unit 1054 so as to be displayed.

The noise judgment unit, the noise removal unit, and the quantization-width check unit will be explained below: Basically, the present blocks have basically the same functions as those of the noise judgment unit, the noise removal unit, and the quantization-width check unit in FIG. 2. In the present embodiment, however, the frequency transform size is the variable size ranging from the 4-pixel×4-pixel size to the 8-pixel×8-pixel size. Accordingly, the processings are executed in compliance with the frequency transform size employed then. The block partition size can be known by acquiring the DCT size from the sub information in the VLD block.

The DF2 unit 1055 will be explained below: In the present block, the deblocking filter is applied to an image whose noise has been already removed in the noise removal unit, or a block whose noise removal has been judged to be unnecessary in the noise judgment unit. Nevertheless, with respect to the image whose noise has been already removed in the noise removal unit, the deblocking filter need not necessarily be applied in the present block. This is of course because the noise removal has been already terminated.

Also, even if the noise removal has been already executed, a judgment as to whether or not to execute the deblocking filter may be switched, depending on the result of the noise removal.

Also, the DF2 unit 1055 is the block which has basically the same functions as those of the DF unit 1011, except that the DF2 unit 1055 makes the judgment as to whether or not to apply the deblocking filter if the noise removal has been already executed in the noise removal unit. Consequently, one and the same circuit may be used as these units.

Embodiment 5

The fourth embodiment has been the case where the noise removal is executed with respect to the decoded image. The present embodiment, however, describes a case where the noise removal is executed on the frequency domain. The basic concept of the present embodiment is basically the same as the one of the third embodiment. The encoding standards employed therebetween, however, are different from each other, and thus the encoding tools are different from each other. As a result, the scheme of the third embodiment cannot be directly applied to the present embodiment. Accordingly, in the present embodiment the detailed explanation will be given below regarding portions of the distinction therebetween at the time when the H.264 or the VC1 is employed.

Figure 11:
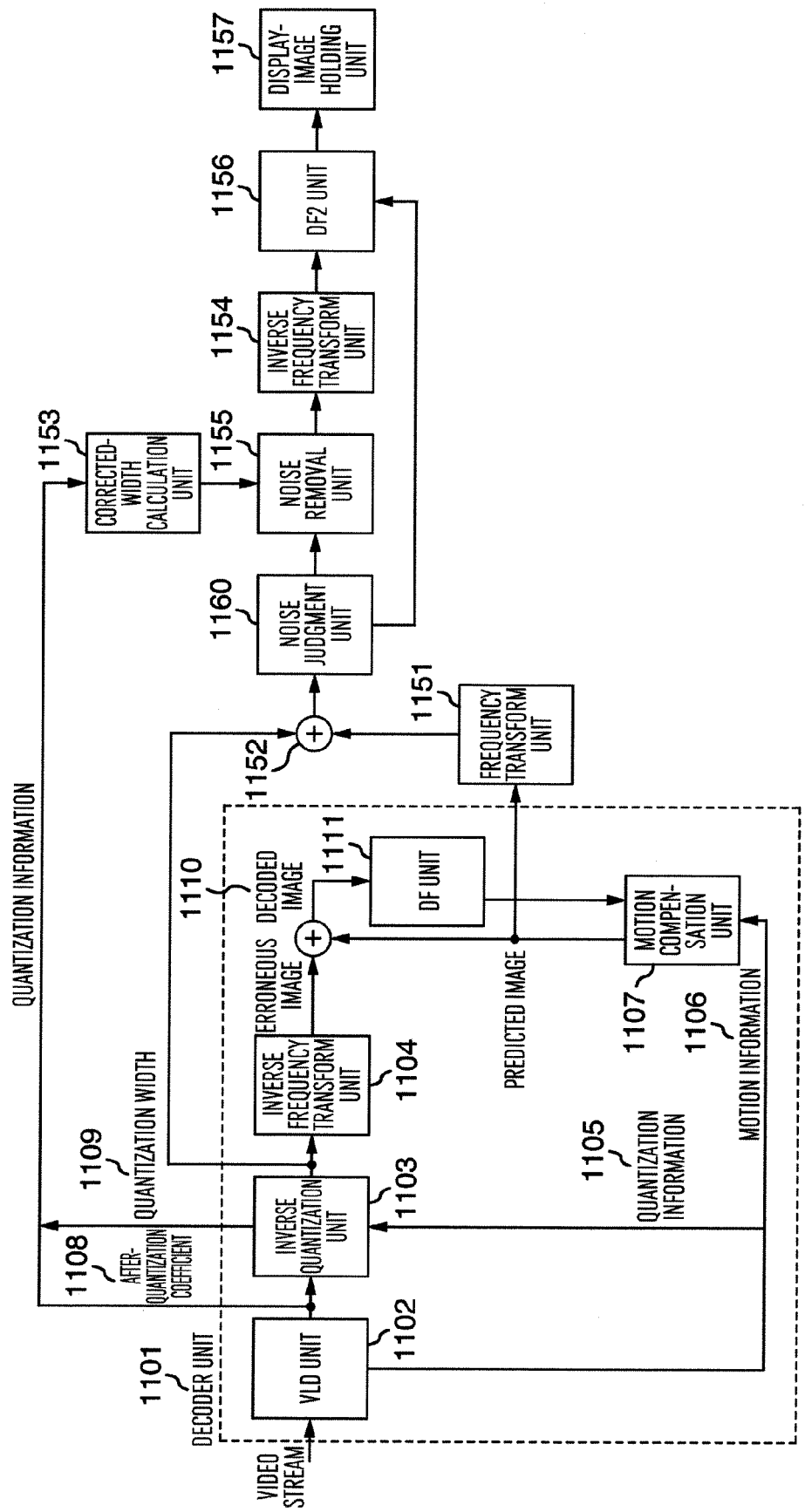

FIG. 11 illustrates the configuration where the noise removal is executed on the frequency domain at the time when the standard such as H.264 or VC1 is employed. The configuration of a decoder unit 1101 is basically the same as the one of the decoder unit 1001 in FIG. 10.

A frequency transform unit 1151 is a block for applying the frequency transform to the after-motion compensation data created inside the decoder device. When executing the frequency transform, the frequency transform needs to be executed in compliance with the DCT block size employed. The information on the DCT block size can be acquired from the VLD block.

An adder 1152, a frequency transform unit 1151, a noise judgment unit 1160, a noise removal unit 1155, a corrected-width calculation unit 1153, an inverse frequency transform unit 1154, and a display-image holding unit 1157 have basically the same functions as those of the configuration in FIG. 3. In the present embodiment, however, the DCT block size is the variable block-partition size ranging from the 4-pixel×4-pixel size to the 8-pixel×8-pixel size. Accordingly, the quantization is also executed in accordance with the block size employed then. Consequently, it turns out that the quantization processing is executed with this block size in mind.

A DF2 unit 1156 will be explained below: The present block has basically the same functions as those of the DF2 1055 in FIG. 10.

Referring to the accompanying drawings, the foregoing explanation has been given with respect to the preferred embodiments of the present invention. It is needless to say, however, that the present invention is not limited to these embodiments. For example, the above-described embodiments have been explained in specific detail in order to explain the present invention in an easy-to-understand manner. Namely, the present invention is not necessarily limited to the embodiments which include all of the configurations explained. It is apparent for those who are skilled in the art that various types of modifications and amendments can be devised within the scope of the technical ideas disclosed in the appended claims. Accordingly, it should be understood that these modifications and amendments also naturally belong to the technical scope of the present invention.

The invention claimed is:

1. An image data processing device, comprising:
   a decoder device configured to effect:
   a Variable Length Decoding (VLD) unit for decoding a digital-image-compressed stream into image data and sub information;
   an inverse quantization unit for inversely quantizing said image data decoded by said VLD unit;
   an inverse frequency transform unit for inversely frequency-transforming said inversely-quantized image data; and
   a motion compensation unit for executing a motion compensation based on said sub information decoded by said VLD unit;
   an information holding unit for holding said sub information by the amount of a plurality of blocks, said sub information being decoded by said VLD unit;
   a noise judgment unit for making a judgment on whether noise removal is to be executed or not, for each block of a decoded image generated by said decoder device, and said information holding unit;
   a noise removal unit for executing said noise removal of a block whose noise removal has been judged to be executed by said noise judgment unit, using said image data outputted from said inverse quantization unit, motion compensation data outputted from said motion compensation unit, and said sub information held in said information holding unit; and
   a display-image holding unit for holding, as a display image, a decoded image after noise has been removed by said noise removal unit if said noise removal has been judged to be executed by said noise judgment unit, or said decoded image outputted from said decoder device if said noise removal has been judged not to be executed thereby, wherein
   said noise removal by the noise removal unit being executed by correcting a coefficient for the decoded image outputted from the decoder device; and
   said correction being executed within a range where coefficient value for the corrected decoded image becomes a coefficient value of the decoded image outputted from the decoder device when inverse-quantized using a quantization width included in said sub information.

2. The image data processing device according to claim 1, wherein
   a judgment as to whether or not to execute said noise removal is determined based on edge information and quantization values of said block whose noise removal has been judged to be executed.

3. The image data processing device according to claim 1, wherein
   correction values for said inversely-quantized coefficient values when said noise removal is executed are calculated using image data on an adjacent block, and
   said adjacent block being adjacent to said block whose noise removal has been judged to be executed, and quantization values of said adjacent block being small.

4. The image data processing device according to claim 1, wherein
   said decoder device is a Motion Picture Experts Group 2 (MPEG2) decoder, where MPEG2 is an image-compression-dedicated international standard scheme.

5. The image data processing device according to claim 1, wherein
   said decoder device is an H.264 decoder, where H.264 is an image-compression-dedicated international standard scheme.

* * * * *

UNITED STATES PATENT AND TRADEMARK OFFICE
CERTIFICATE OF CORRECTION

PATENT NO. : 8,929,439 B2  
APPLICATION NO. : 12/993920  
DATED : January 6, 2015  
INVENTOR(S) : Yusuke Yatabe et al.

Page 1 of 1

It is certified that error appears in the above-identified patent and that said Letters Patent is hereby corrected as shown below:

On the Title Page

At item (73) Assignee:

"Hitachi Maxwell, Ltd., Osaka (JP)" should read -- Hitachi Maxell, Ltd., Osaka (JP) --

Signed and Sealed this  
Eleventh Day of August, 2015

Michelle K. Lee  
*Director of the United States Patent and Trademark Office*